(12) United States Patent
Nothum, Jr. et al.

(10) Patent No.: US 11,412,772 B2
(45) Date of Patent: Aug. 16, 2022

(54) REDUCED-SCALE DRUM MOTOR ROLLER DRIVE FOR ENLARGED-SCALE DRUM COATING APPARATUS FOR FOOD PROCESS LINES

(71) Applicants: Robert G. Nothum, Jr., Willard, MO (US); Ryan D. Nothum, Springfield, MO (US)

(72) Inventors: Robert G. Nothum, Jr., Willard, MO (US); Ryan D. Nothum, Springfield, MO (US)

( * ) Notice: Subject to any disclaimer, the term of this patent is extended or adjusted under 35 U.S.C. 154(b) by 24 days.

(21) Appl. No.: 17/150,771

(22) Filed: Jan. 15, 2021

(65) Prior Publication Data
US 2021/0212353 A1 Jul. 15, 2021

Related U.S. Application Data

(60) Provisional application No. 62/966,702, filed on Jan. 28, 2020, provisional application No. 62/961,421, filed on Jan. 15, 2020.

(51) Int. Cl.
*A23P 20/13* (2016.01)
*B05C 3/08* (2006.01)
*A23G 3/20* (2006.01)
*A23G 3/26* (2006.01)
*A23L 13/00* (2016.01)

(52) U.S. Cl.
CPC ............ *A23P 20/13* (2016.08); *A23G 3/2076* (2013.01); *A23G 3/26* (2013.01); *B05C 3/08* (2013.01); *A23L 13/03* (2016.08)

(58) Field of Classification Search
CPC ......... A23G 3/2076; A23G 3/26; A23L 13/03; A23P 20/12; A23P 20/13; B05C 3/08
USPC .............................. 118/19, 417, 418; 99/494
See application file for complete search history.

(56) References Cited

U.S. PATENT DOCUMENTS 5,937,744 A * 8/1999 Nothum, Sr. ........... A23L 13/03
                                                  118/18
7,231,885 B1 6/2007 Nothum, Jr. et al. .......... 118/19

* cited by examiner

*Primary Examiner* — Laura Edwards
(74) *Attorney, Agent, or Firm* — Jonathan A. Bay

(57) ABSTRACT

A reduced-scale drum motor roller drive is combined with a rotating enlarged-scale hard drum on the rotation axis of the hard drum. A source of electric power rotates the drum motor roller which thereby rotates the hard drum for tumbling and/or coating service in an automated and/or mechanized food process lines.

20 Claims, 12 Drawing Sheets

REDUCED-SCALE DRUM MOTOR ROLLER DRIVE FOR ENLARGED-SCALE DRUM COATING APPARATUS FOR FOOD PROCESS LINES

CROSS-REFERENCE TO PROVISIONAL APPLICATION(S)

This application claims the benefit of U.S. Provisional Application No. 62/961,421, filed Jan. 15, 2020; and U.S. Provisional Application No. 62/966,702 filed Jan. 28, 2020. The foregoing patent disclosure(s) is(are) incorporated herein by this reference thereto.

BACKGROUND AND SUMMARY OF THE INVENTION

The invention generally relates to automatic and/or mechanized food-process line equipment and, more particularly, to a reduced-scale drum motor roller drive for enlarged-scale drum coating apparatus for food process lines.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 2 is taken from FIG. 7 of applicant's own U.S. Pat. No. 7,231,885—Nothum et al., which is incorporated fully herein by this reference thereto;

DETAILED DESCRIPTION OF THE PREFERRED EMBODIMENTS

Figure 1:
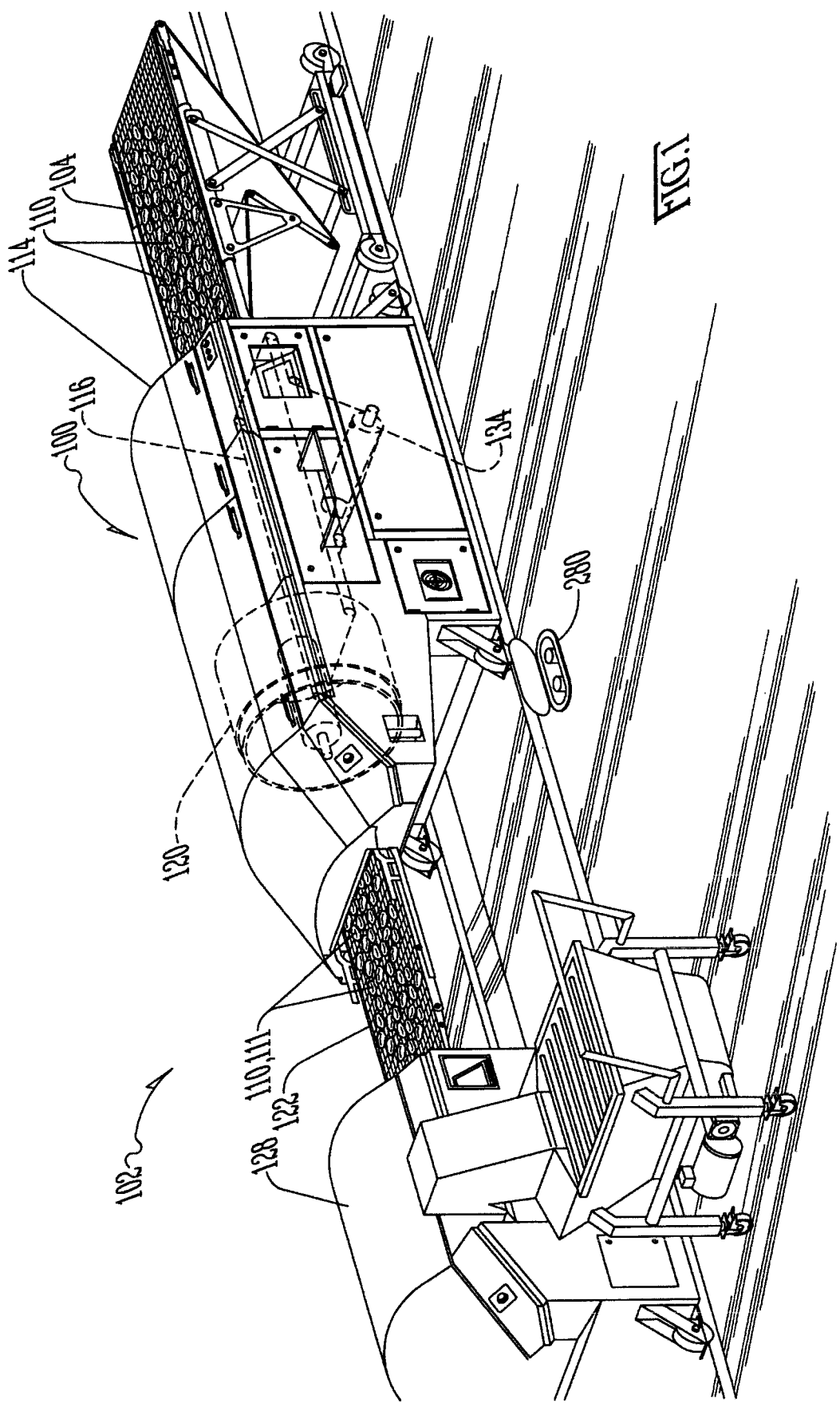
FIG. 1 is a perspective view of drum coating apparatus in accordance for the invention for automatic and/or mechanized food-process lines.

FIG. 1 shows a drum coating apparatus 100 in accordance for the invention for automatic and/or mechanized food-process line 102. An upline transfer conveyor 104 is feeding food-product pieces 110 into the infeed end 114 of the of the coating apparatus 100. An infeed conveyor 116, typically a wire mesh endless belt, conveys the food product pieced 110 for depositing them into a rotating hard drum 120 that serves a tumbling and coating function.

The typical food product pieces 110 might be whole meat pieces like chicken tenders for example and without limitation. The coating material 11 is likely some dry particulate material like flour, crumbs, cereal or meal or the like.

The food product pieces 110 and the coating material 11 fed into the rotating drum 120 and are tumbled together, to be ultimately discharged onto a receiving conveyor 122, which is also preferably an endless wire mesh belt. Excess coating material 124 can fall through the receiving conveyor 122 into a coating material recirculation system 126. The coated food product pieces 110-11 are thus prepped for conveyance to downline process events, as for example and without limitation a batter coating machine 128 as shown in FIG. 1.

Figure 2:
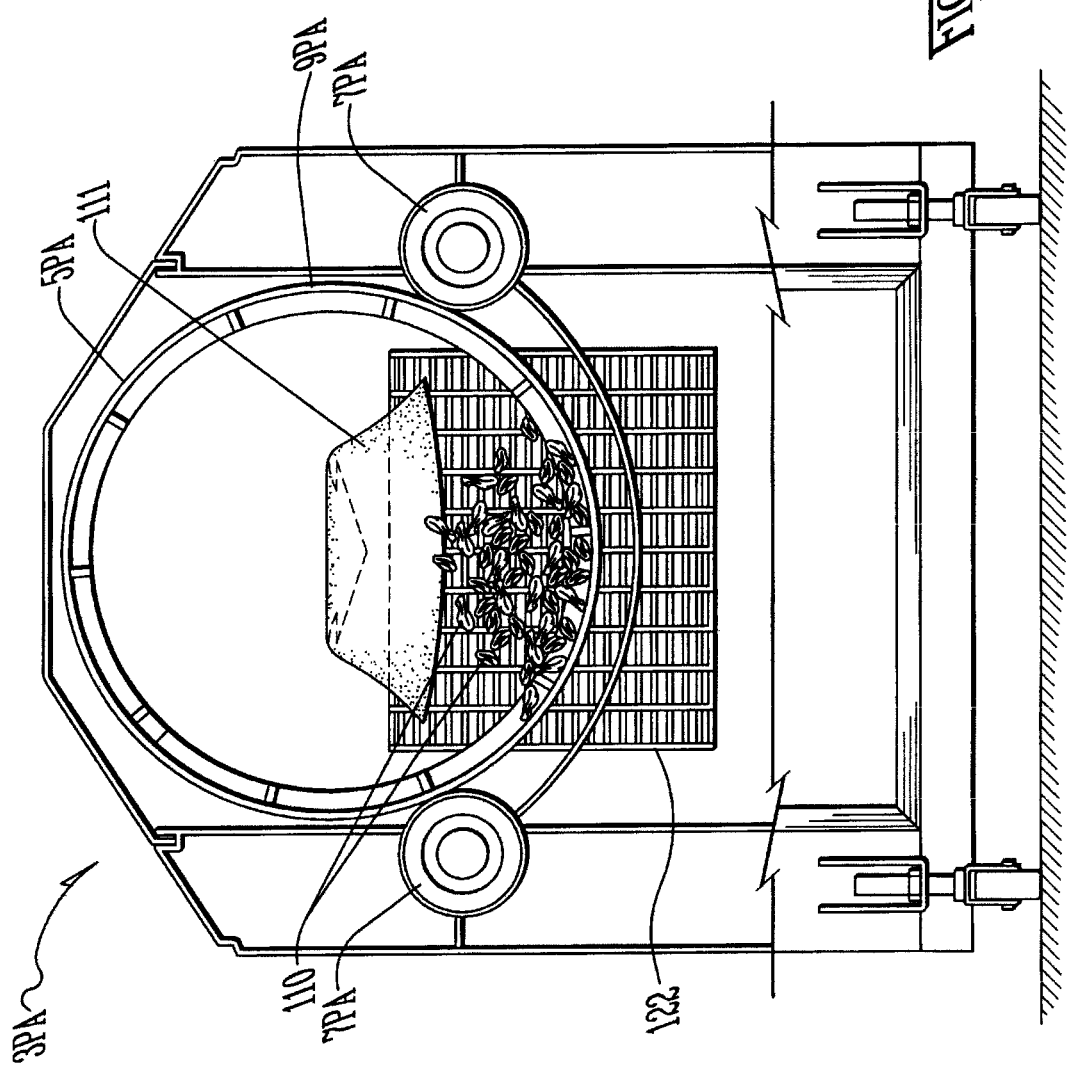
FIG. 2 is a discharge-end elevational view of a hard drum tumbling coating apparatus in accordance with the prior art, likewise for automatic and/or mechanized food-process lines, wherein this
Figure 3:
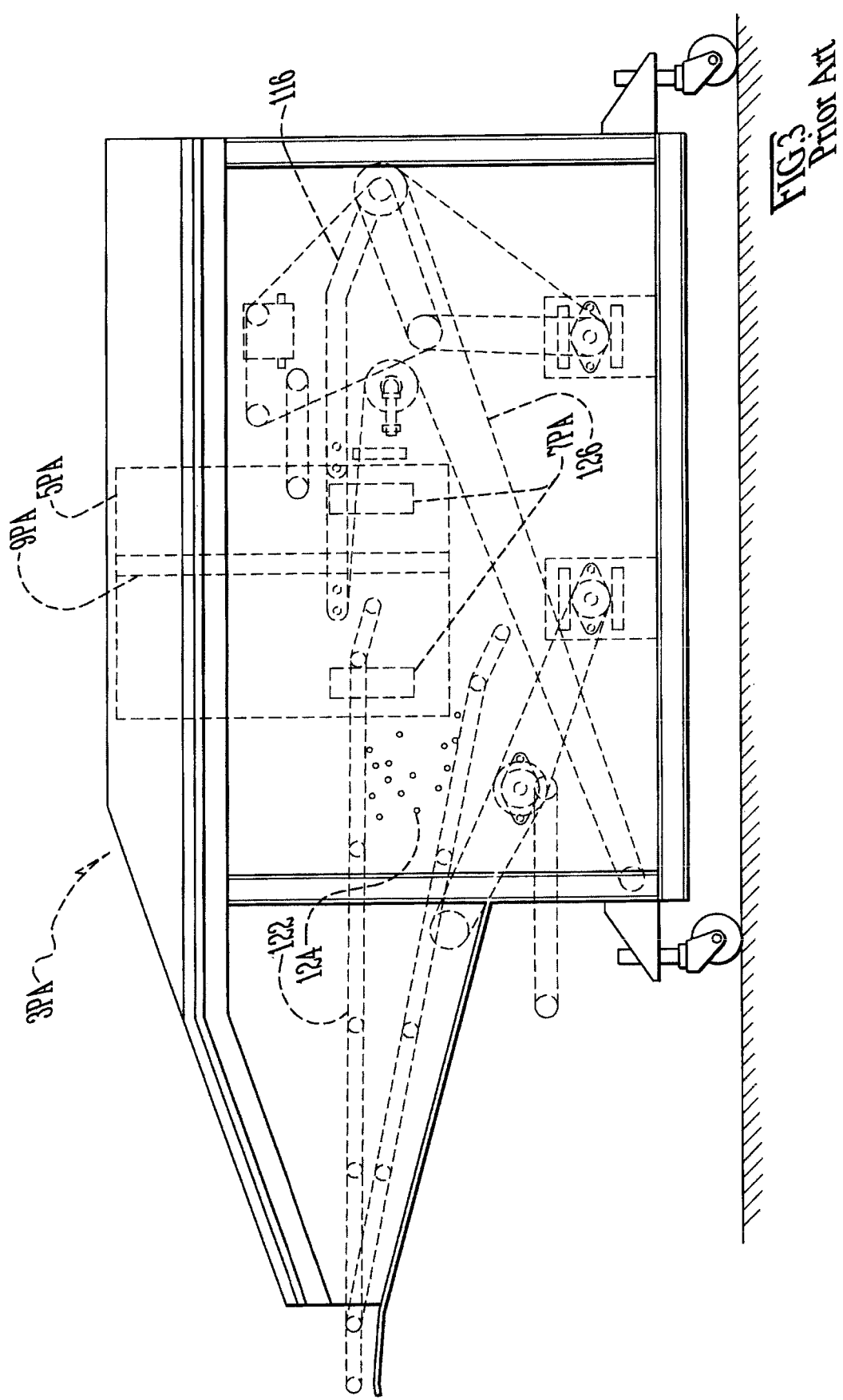
FIG. 3 is a side elevational schematic thereof from the left-side of FIG. 2.
Figure 7:
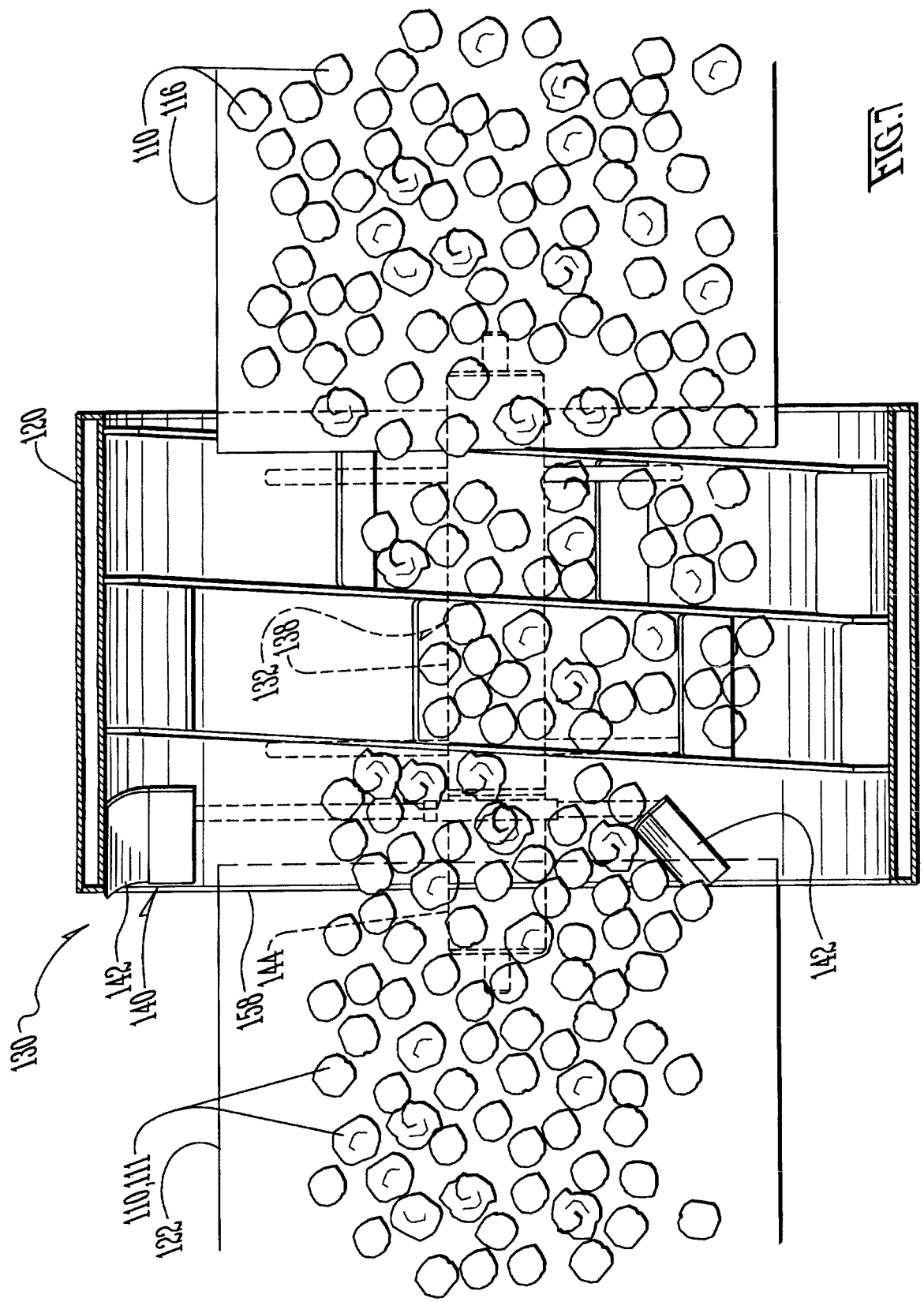
FIG. 7 is a top plan schematic view of FIGS. 5 and 6, partly in section, with the receiving outflow conveyor and the pattern of the discharged food product pieces also illustrated in this FIG. 7.

FIGS. 2 and 3 show a hard drum tumbling coating apparatus 3PA in accordance with the prior art, likewise for automatic and/or mechanized food-process lines, wherein FIG. 2 is taken from FIG. 7 of applicant's own U.S. Pat. No. 7,231,885—Nothum et al.

The drum 5PA in FIGS. 2 and 3 is supported for rotation on its generally horizontal axis of revolution by four (4) or more space idler tires 7PA. The are left-side front and rear idler tires 7PA symmetrically-disposed with respect to right-side front and rear idler tires 7PA (only rear idler tires shown in FIG. 2).

The drum 5PA in FIGS. 2 and 3 has an encircling gear track (not shown, but like a rack in a rack and pinion gear arrangement) around the outside of its cylindrical drive wall 9PA for engagement with a driven sprocket (not shown) for rotating the drum 5PA about its rotation axis, and which sprocket (again, not shown) is driven by a drive motor (also not shown), which can be electric or hydraulic-powered and the like.

There are numerous times when it is desirable to remove the hard drum 5PA out of the larger machine 3PA shown in FIG. 3, and substitute in its place an alternate food process accessory for functions other than tumbling. However, the removal and then the opposite return installation of the drum 5PA in FIGS. 2 and 3 with respect to the machine 3PA in FIGS. 2 and 3 is cumbersome.

It is an object of the invention to provide some respective improvements in this state of matters.

Figure 4:
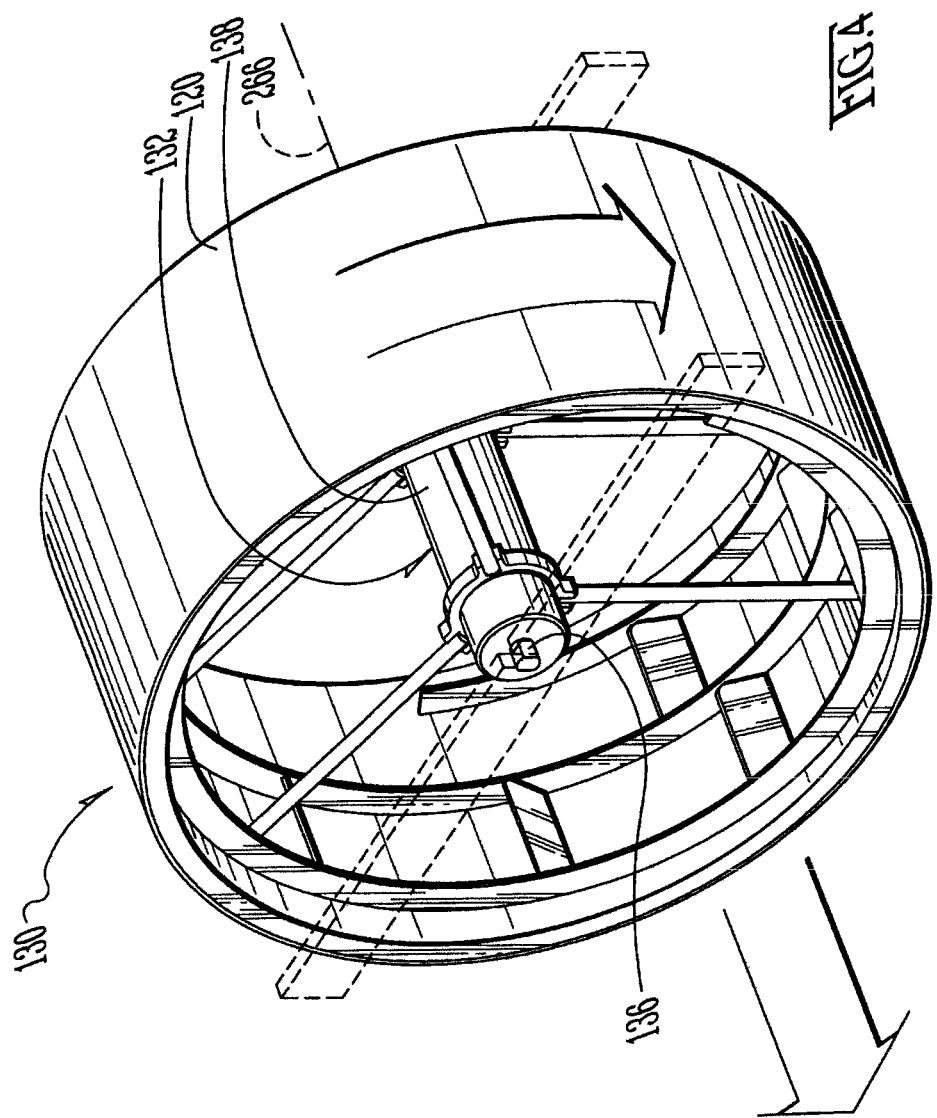
FIG. 4 is a perspective view of a combination in accordance with the invention reduced-scale drum motor roller drive and a rotating enlarged-scale hard drum driven thereby, for tumbling and/or coating service in food process lines.

FIG. 4 shows a combination 130 in accordance with the invention of a reduced-scale drum motor roller drive 132 and a rotational enlarged-scale hard drum 120 driven thereby, for tumbling and/or coating service in food process lines 102.

The hard drum 120 in which food product 110 is tumbled is referred to here as being the "enlarged-scale" drum 120 because, in comparison, it is relatively much larger than the drum motor roller 132, which is referred to here as the "reduced-scale" drum motor roller 132.

Drum motor rollers 132 are akin to motorized pulleys 134, and FIG. 1 shows one such motorized pulley 134 in service driving the infeed conveyor belt 116 of the coating apparatus machine 100.

The "reduced-scale" drum motor roller 132 replaces the outside track, sprocket and drive motor system of the prior art (not shown in FIGS. 2 and 3) as well as the idler tires 7PA in the duties of rotating the prior art "enlarged-scale" hard drum 5PA on its rotation axis.

It is preferred to use a drum motor roller 132 in contrast to FIGS. 2 and 3 arrangement (eg., a standard motor configuration). Standard motors have their skin mounted stationary and their central axle is a rotor which rotates. With drum motor rollers 132, the central axle 136 is held stationary and the skin 138 (the cylindrical casing 138 or outer sidewall 138) rotates. It is preferred to use electric-powered drum motor rollers 132.

The drum motor rollers 132 not only serve to drive the hard drum 120 but they support the hard drum 120 in a "simply supported" support arrangement.

Figure 5:
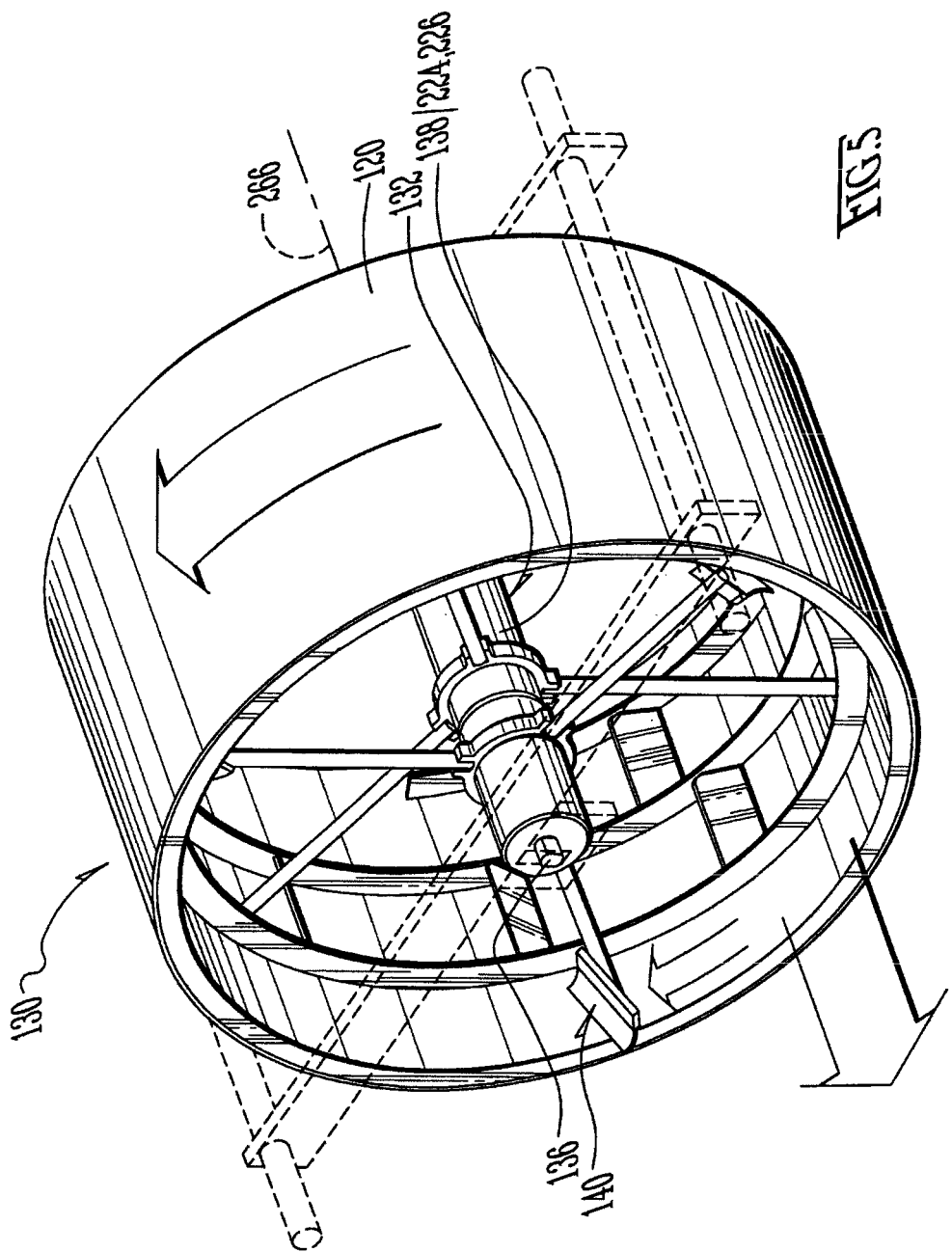
FIG. 5 is a perspective view comparable to FIG. 4 except further combining the combination in accordance with the invention of a reduced-scale drum motor roller drive and rotational enlarged-scale hard drum driven thereby, with:—a food-product spreading system in accordance with the invention, comprising for example and without limitation three counter-rotating angled paddles or wiper-blades to spread discharged food-product pieces out more evenly across the lateral width of the receiving outflow conveyor.

FIG. 5 is a perspective view comparable to FIG. 4 except further combining the combination 130 in accordance with the invention of a reduced-scale drum motor roller drive 132 and rotational enlarged-scale hard drum 120 driven thereby, with:—a food-product spreading system 140 in accordance with the invention.

Figure 6:
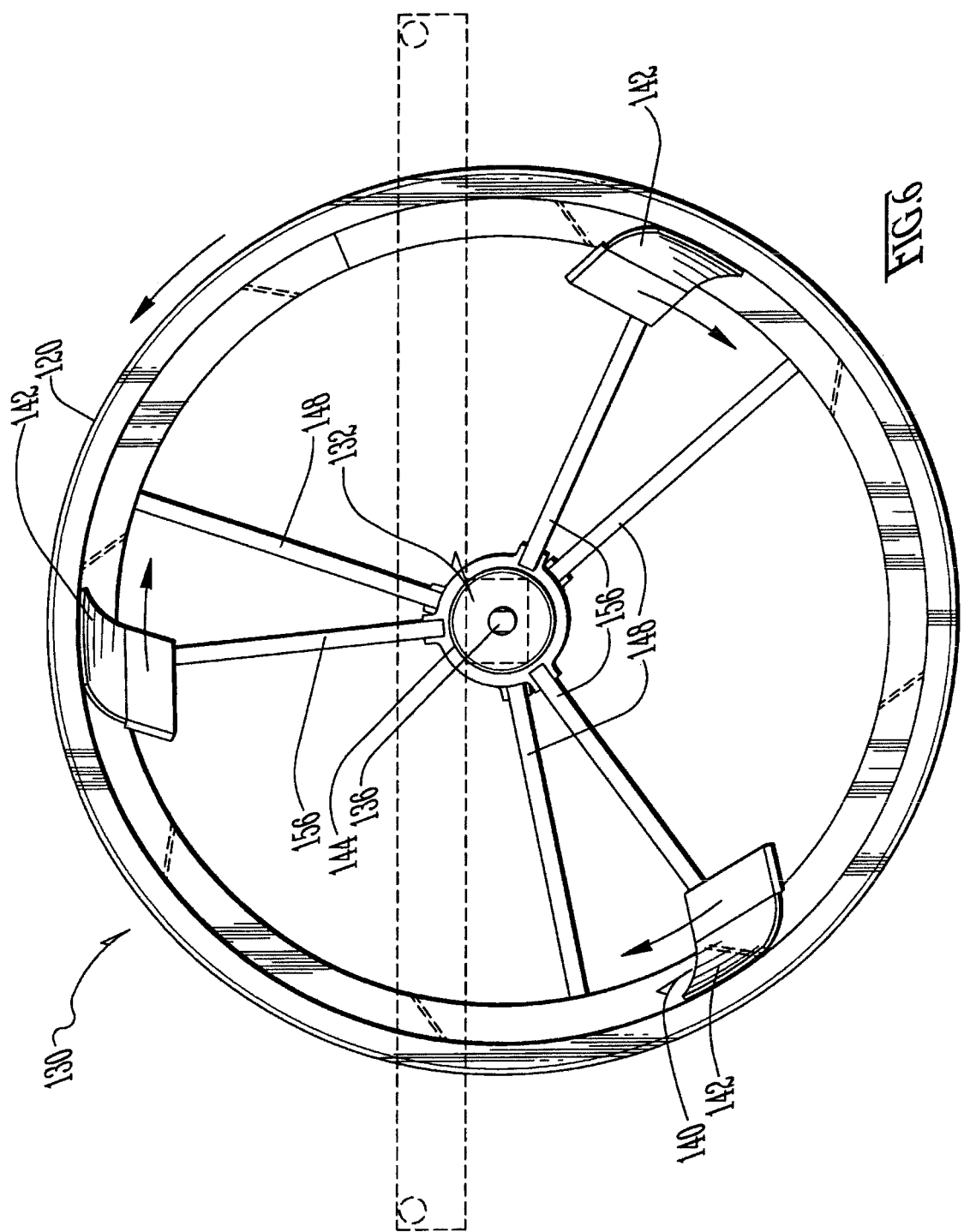
FIG. 6 is a discharge-end elevational view of FIG. 5.

FIGS. 6 and 7 show better that the food product spreading system 140 comprises for example and without limitation three counter-rotating angled paddles 142 or wiper-blades 142 to spread discharged food-product pieces 110-11 out more evenly across the lateral width of the receiving outflow conveyor 122. The angled paddles 142 (or wiper-blades 142) spread the discharged (coated) food-product pieces 110-11 out more laterally-evenly across the width of the receiving outflow conveyor 122 (which might also be called discharge conveyor 122).

The food-product spreading system 140 comprises "n" evenly-spaced counter-rotating paddles 142 (or wiper-blades 142) and a drive means 144 for rotating the counter-rotating paddles 142 at an "n:1" speed ratio relative to the rotary hard drum 120. That way, the food-product 110-11 pieces land on (or are picked up by) the outflow conveyor 122 in courses (eg., rows) that trend diagonally across the width of the outflow conveyor 122. Each course corresponds to one swipe of a paddle 142 (or wiper-blade 142).

Figure 8:
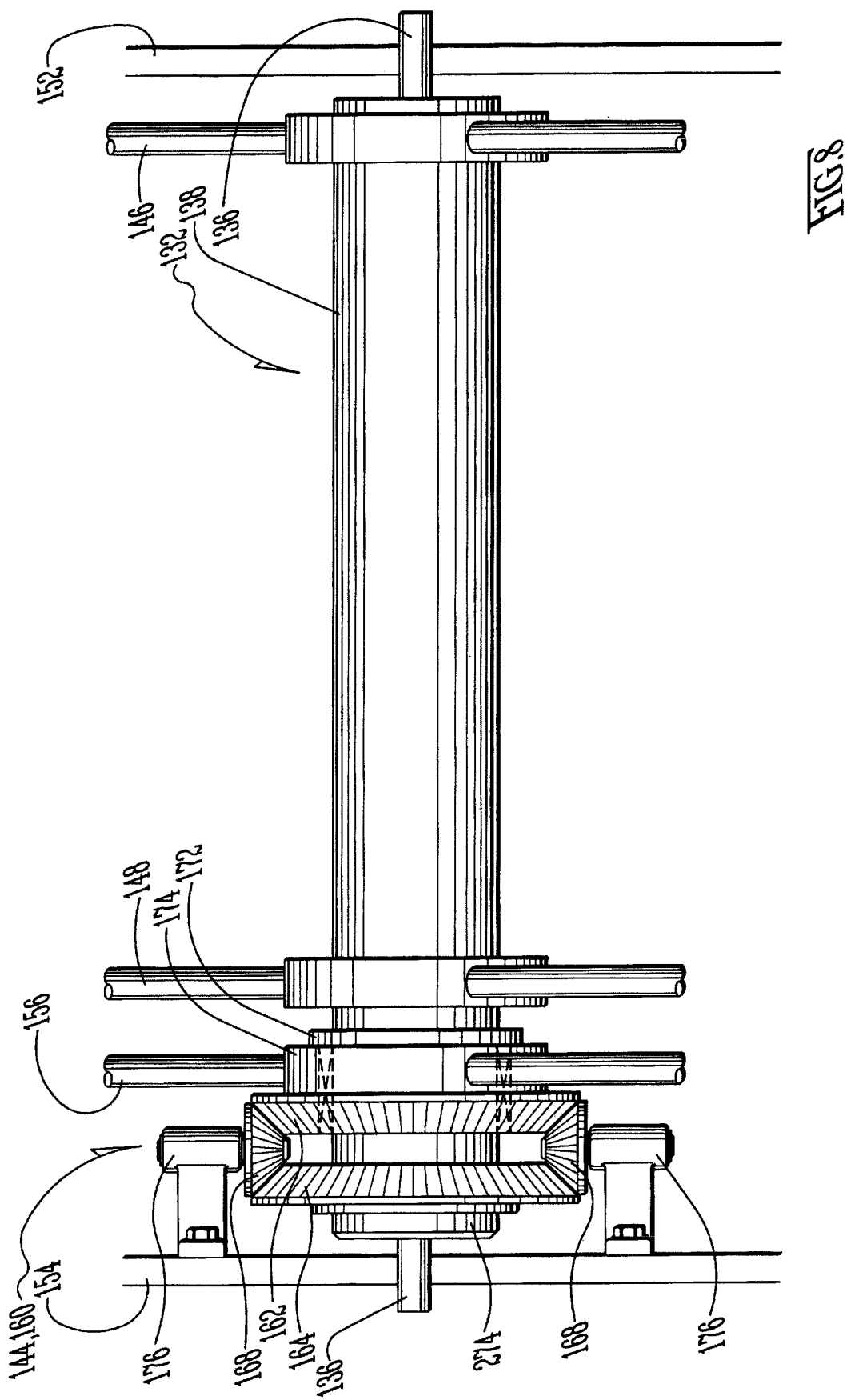
FIG. 8 is an enlarged-scale top plan view of the drum motor roller drive in FIG. 7, with spokes and mounting cross bars partly broken away, showing an upline and downline set of spokes extending radially outward from the outer sidewall of the drum motor roller drive to connect up to the enlarged-scale hard drum (not shown in this view), and not only further showing a third set spokes that are furthest downline (ie., the discharge end is downline from the infeed end), for rotating the counter (or contra) rotating spokes that drive the paddles (or wiper-blades) but also further showing the arrangement of a contra-rotation transmission system comprising bevel gears.

FIG. 8 shows the drum motor roller drive 132 in FIG. 7 mostly in isolation, with spokes 146, 148 and 156 as well as mounting cross bars 152 and 154 partly broken away.

That is, FIG. 8 shows an upline and downline set of spokes 146 and 148 extending radially outward from the outer sidewall 138 of the drum motor roller drive 132 to connect up to the enlarged-scale hard drum 120 (not shown in this view). FIG. 8 furthermore shows a third set spokes 156 that are furthest downline (ie., essentially at the vertical plane of the discharge end 158 of the hard drum 120), for rotating the counter (or contra) rotating paddles 142 (or wiper-blades 142). Moreover still, FIG. 8 also shows an arrangement of a contra-rotation transmission system 160 comprising bevel gears 162, 164 and 168.

The downline end 274 of the drum motor roller 132 (or the outer sidewall 138 proximate the downline end 274) has a bevel gear 162 fastened to it, which faces upline. The outer sidewall 138 further has a shaft collar 172 fixed to it, serving as a stop surface. Abutting the shaft collar 172 immediately downline from it is a contra-rotating hub 174 for the spokes 156 that extend radially out to the contra-rotating paddles 142 (or wiper blades 142, and not shown in FIG. 8).

The contra-rotating hub 174 has a bevel gear 164 of its own fastened to it. A pair of left and right pillow blocks 176 (or the like) support a left side and right side smaller bevel gears 168 respectively for meshing the driving bevel 162 gear fastened to the drum motor roller 132 and the driven bevel gear 164 fastened to the contra-rotating hub 174.

Figure 9:
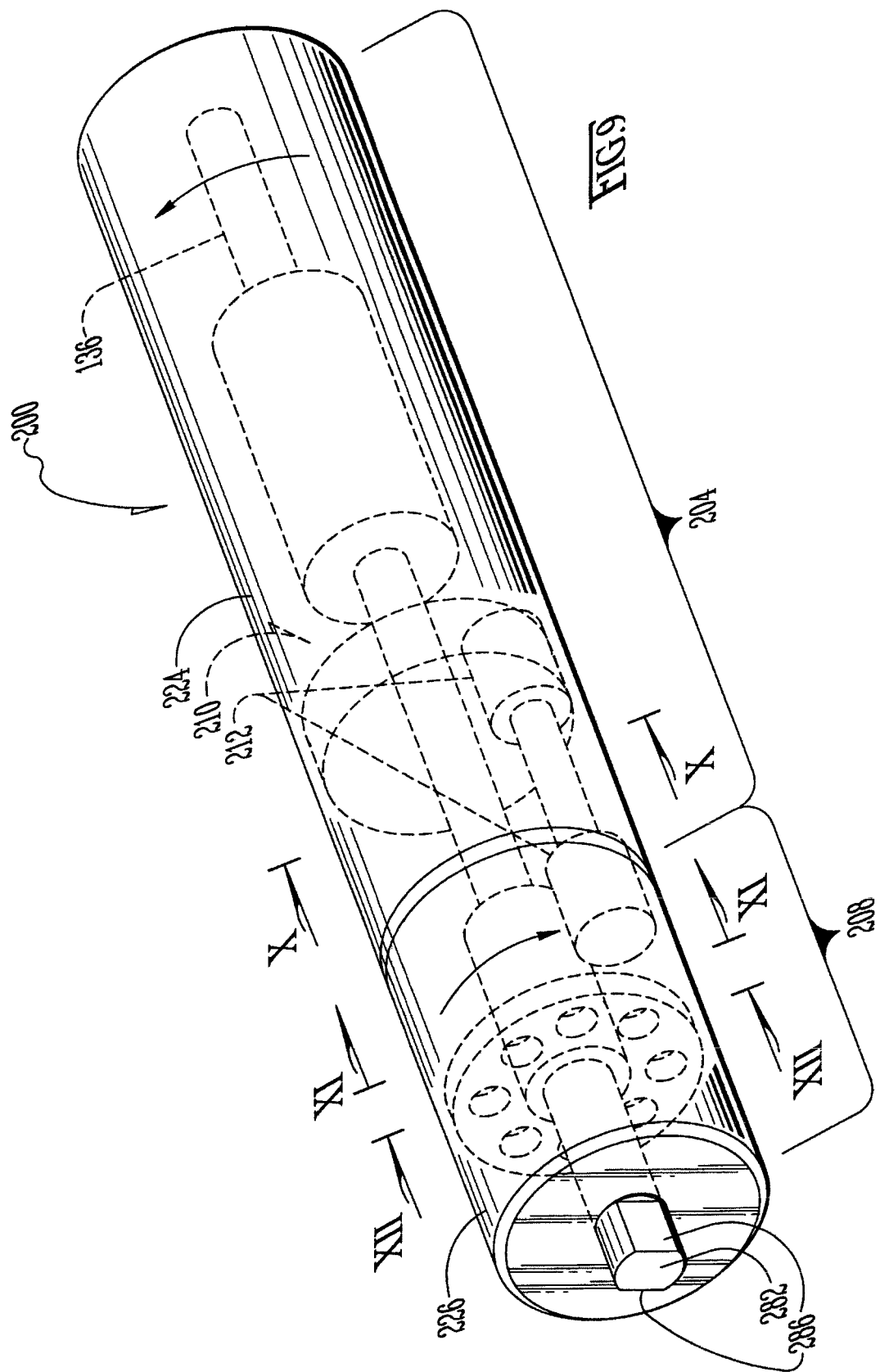
FIG. 9 is a schematic perspective view comparable to FIG. 8 except showing a different embodiment of a drum motor roller drive in accordance with the invention, configured so that the upline three-fourths (or so) of the drum motor roller drive that are connected to the enlarged-scale hard drum (not shown in this view) and rotates the hard drum in one direction (counter-clockwise in FIG. 6), and which drum motor roller drive is further configured so that the downline one-fourth (or so) of the drum motor roller drive is connected to the counter (or contra) rotating spokes for rotating the paddles (or wiper-blades) in the opposite direction (clockwise in FIG. 6), and then this FIG. 9 moreover shows a different embodiment of a contra-rotation transmission system comprising planetary gears housed within the outer sidewall(s) of the drum motor roller drive.
Figure 10:
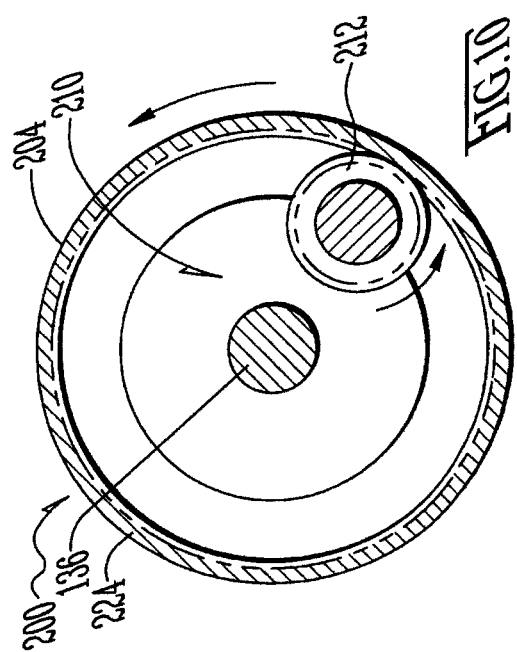
FIG. 10 is an enlarged-scale section view taken along line X-X in the above FIG. 9.
Figure 11:
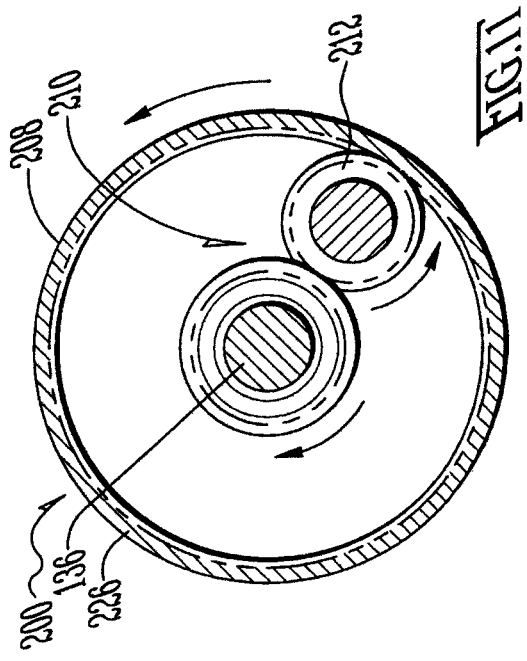
FIG. 11 is an enlarged-scale section view taken along line XI-XI in the above FIG. 9.
Figure 12:
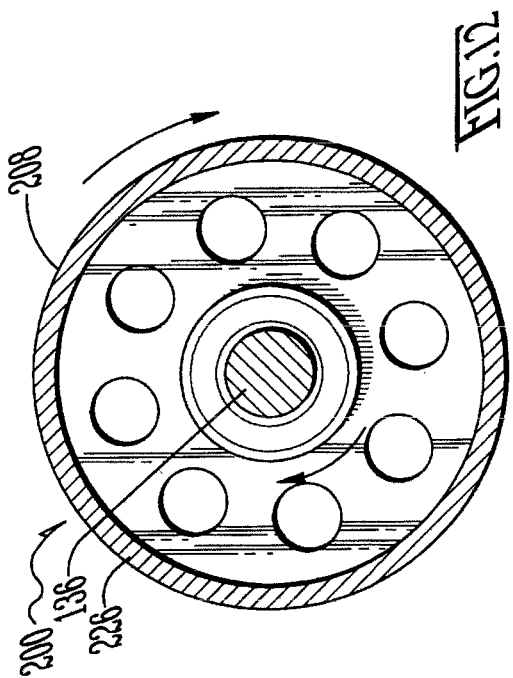
FIG. 12 is an enlarged-scale section view taken along line XII-XII in the above FIG. 9.

FIG. 9 is comparable to FIG. 8 except showing a different embodiment of a drum motor roller drive 200 in accordance with the invention, configured so that the upline three-fourths 204 (or so) of the drum motor roller drive 200 that are connected to the enlarged-scale hard drum 120 (not shown in this view) and rotates the hard drum 120 in one direction (counter-clockwise in FIG. 6). This embodiment of the drum motor roller drive 200 is further configured so that the downline one-fourth 208 (or so) of the drum motor roller drive 200 is connected to the counter (or contra) rotating spokes 156 for rotating the paddles 142 (or wiper-blades 142) in the opposite direction (clockwise in FIG. 6). FIG. 9 moreover shows a different embodiment of a contra-rotation transmission system 210 comprising planetary gears 212 housed within the outer sidewalls 224 and 226 of the drum motor roller drive 200. FIG. 10 is a section view taken along line X-X in FIG. 9. Whereas FIG. 11 is a section view taken along line XI-XI in FIG. 9. And FIG. 12 is a section view taken along line XII-XII in the above FIG. 9.

Figure 13:
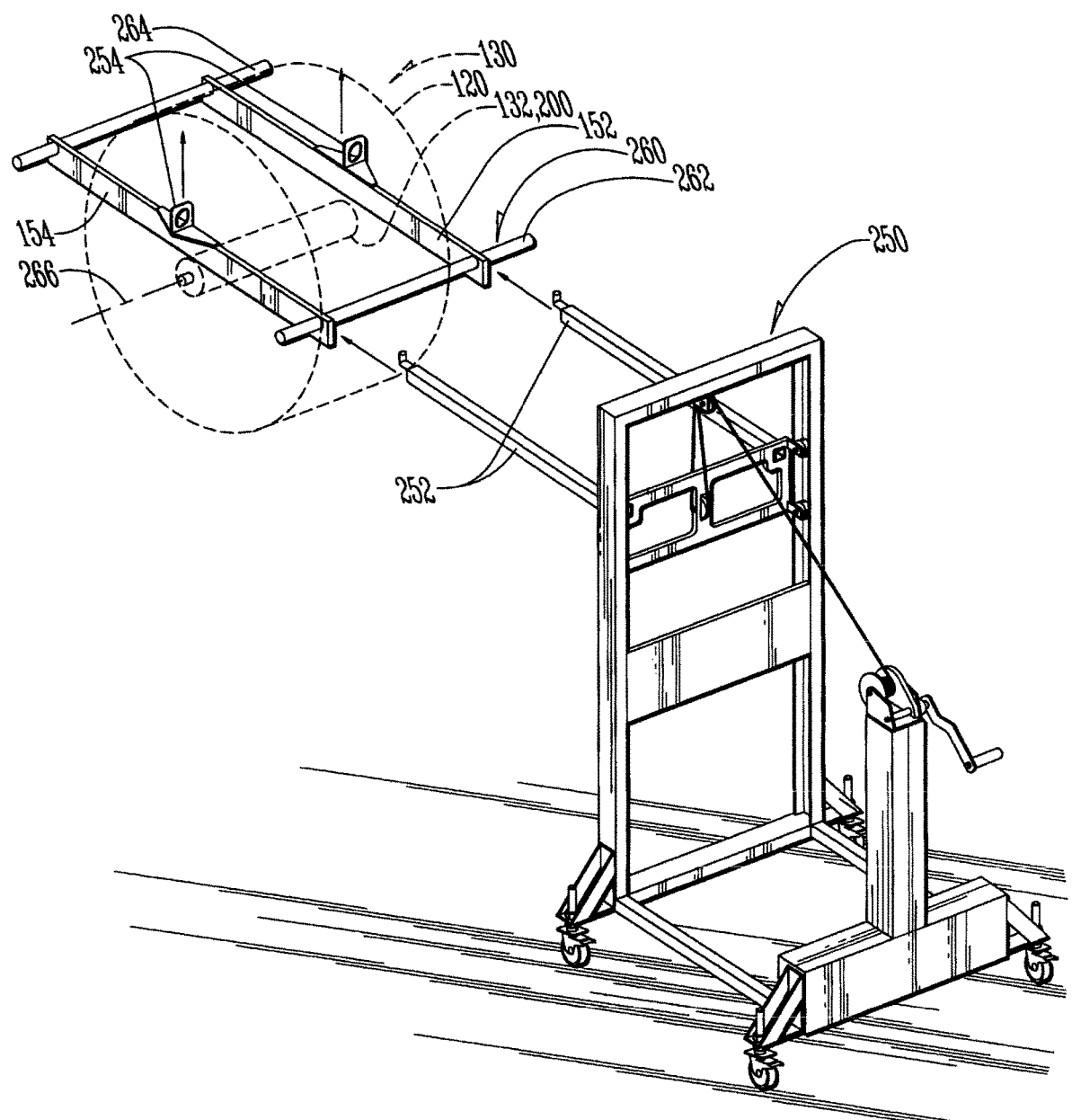
FIG. 13 is an reduced-scale perspective view of a manually-wheeled, as well as manually-operated fork lift that is configured in accordance with the invention for lifting and removing the combination reduced-scale drum motor roller drive and rotational enlarged-scale hard drum driven (enhanced with or not (ie., with or without) the counter or contra rotating food-product spreading system) not only out of the larger coating apparatus shown in FIG. 1, but leaving an un-occupied space in the larger coating apparatus shown in FIG. 1 for substitution of any other food process line accessory (no other food process line accessory shown installed in place of the hard drum)

FIG. 13 shows a manually-wheeled, as well as manually-operated fork lift 250 that is configured in accordance with the invention for lifting the and removing the combination 130 reduced-scale drum motor roller drive 132 and rotational enlarged-scale hard drum 120 driven (regardless if enhanced with or not (ie., with or without) the counter or contra rotating food-product spreading system 140).

The fork lift 250 not only lifts and removes the combination 130 out of and from the larger coating apparatus 100 shown in FIG. 1, but leaves an un-occupied space in the larger coating apparatus 100 shown in FIG. 1 for substitution of any other food process line accessory (no other food process line accessory shown installed in place of the hard drum 120).

Figure 14:
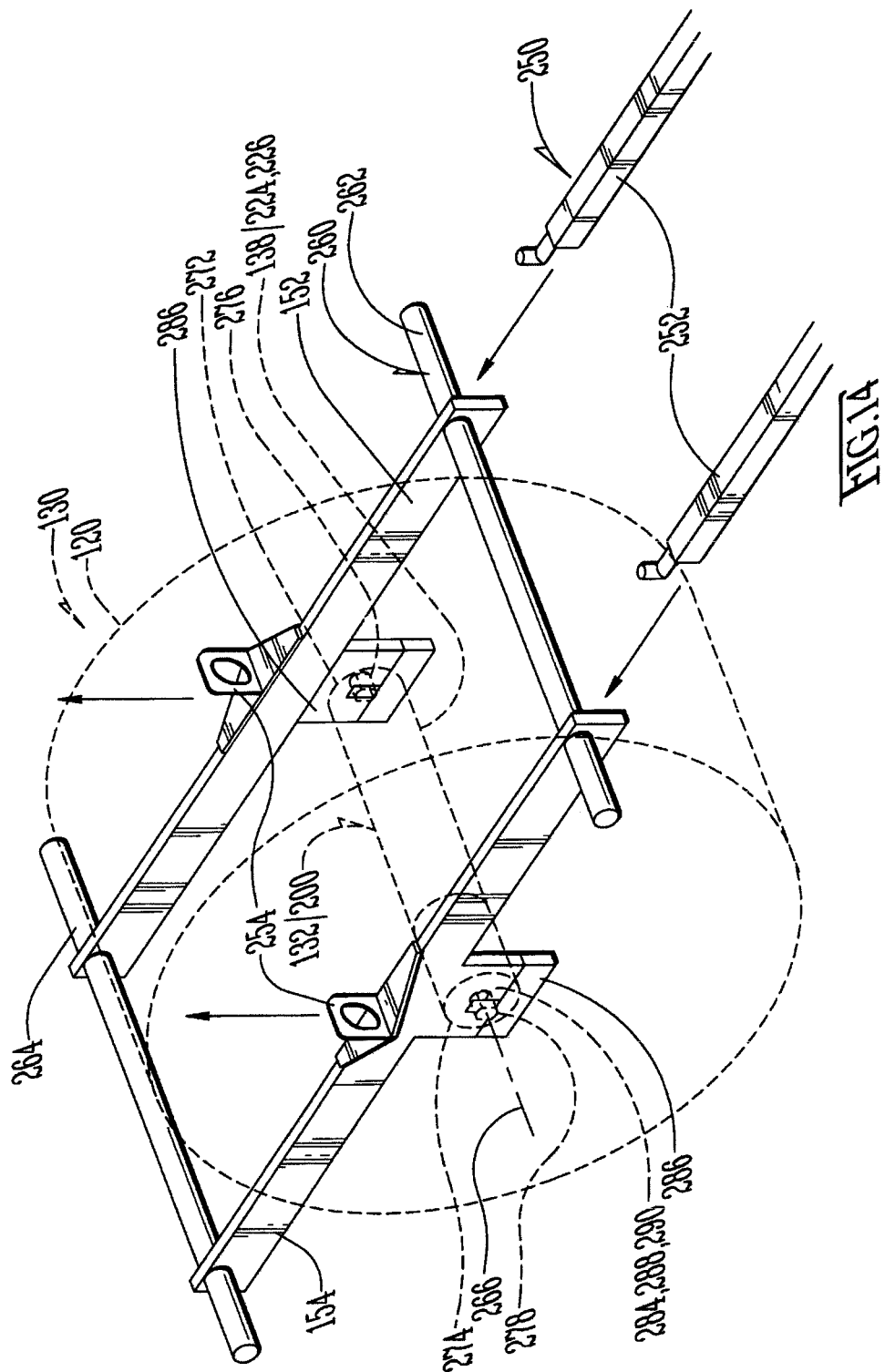
FIG. 14 is an enlarged-scale detail of FIG. 13 showing how the outreaching forks of the manual fork lift (the ends of the forks aside, the rest of the fork lift is removed from the view) hook up to eye fixtures on the spaced cross bars of the mounting frame.

FIG. 14 is an enlarged-scale detail of FIG. 13 showing how the outreaching forks 252 of the manual fork lift 250 (the ends of the forks 252 aside, the rest of the fork lift 250 is removed from the view) hook up to eye fixtures 254 on the spaced cross bars 152 and 154 of the mounting frame 260.

The combination 130 drum motor 132 and hard drum 120 tumbling drum are mounted in a rigid frame 260 which in use is aligned in about a horizontal plane. The frame 260 has upline and downline cross bars 152 and 154 spaced by left and right side rails 262 and 264. The eye fixtures 254 are located on the cross bars 152 and 154 such that the combination 130 drum motor 132 and hard drum 120 tumbling drum in accordance with the invention are balanced such that when lifted, the rigid frame 260 tends to find level. This balancing location and disposition for the eye bolts is chosen and located to be balanced for the combination 130 in accordance with the invention regardless if enhanced with or not (ie., with or without) the counter or contra rotating food-product spreading system 140.

Given the foregoing, a food-product tumbling and coating apparatus (100) for automated and/or mechanized food-process lines (102) preferably comprises without limitation:

an enlarged-scale hollow hard drum (120) for rotation about a generally horizontal rotation axis (266) for tumbling and coating services;

a reduced-scale, elongated drum motor roller drive (132/200) having an elongated outer sidewall (138/224,226) extending between an upline end (272) and downline end (274), and having respective upline and downline stub ends (276 and 278) of a central axle (136) extending out of the upline and downline end (272 and 274) respectively;

a source of electric power (280) for the drum motor roller drive (132/200);

a rigid mounting frame 260 having upline and downline cross bars (152 and 154) spaced by left and right side rails (262 and 264), wherein the drum motor roller drive (132/200) is simply supported by the spaced stub ends (276 and 278) engaging the spaced cross bars (152 and 154);

wherein the spaced stub ends (276 and 278) have an engagement geometry (284) and the cross bars (152 an)d 154 have a complimentary engagement geometry (286) to provide for the docking of the stub ends (276 and 278) and prevent relative rotation among the stub ends (276 and 278) and the cross bars (152 and 154);

wherein the engagement geometry (284) comprises diametrically-opposed parallel flats (286) on the stub ends (272 and 278) and spaced flanking parallel side edges (288) of slots (290) in the cross members (152 and 154); and a plurality of fixed spokes (146,148) extending radially out from the outer sidewall (138/224,226) of the drum motor roller (132/200) to connect to the hard drum (120) with the drum motor roller (132/200) disposed on the rotation axis (266) of the hard drum (120).

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. Food-product tumbling and coating apparatus for automated and/or mechanized food-process lines; comprising:

an enlarged-scale hollow rigid drum axially elongated between an upline infeed end and a downline discharge end, and whereby adapted for rotation about a generally horizontal rotation axis for tumbling and coating services;

a reduced-scale, elongated drum motor roller drive having an elongated outer sidewall extending between an upline end and a downline end, and having a central axle with respective upline and downline stub ends for the central axle extending out of the upline and downline ends respectively;

a source of electric power for the drum motor roller drive;

a rigid mounting frame having upline and downline cross bars spaced by left and right side rails, wherein the drum motor roller drive is simply supported by the spaced stub ends engaging the spaced cross bars;

wherein the spaced stub ends have an engagement geometry and the cross bars have a complimentary engagement geometry to provide for the docking of the stub ends and prevent relative rotation among the stub ends and the cross bars; and a plurality of fixed spokes extending radially out from the outer sidewall of the drum motor roller to connect to the hollow drum with the drum motor roller disposed on the rotation axis of the hollow drum.

2. The food-product tumbling and coating apparatus of claim 1, further comprising:

an infeed conveyor; and a receiving outflow conveyor;

said infeed conveyor and said hollow drum being cooperatively configured wherein said infeed conveyor is adapted to receive a feed of food-product pieces from upline apparatus and deposit the food-product pieces into the rotating hollow drum as thereby for tumbling and coating purposes;

said hollow drum and said receiving outflow conveyor being cooperatively configured wherein said rotating hollow drum discharges food-product pieces onto the receiving outflow conveyor.

3. The food-product tumbling and coating apparatus of claim 2, further comprising:

a food-product spreading system; and said receiving outflow conveyor having a lateral width;

said hollow drum, said receiving outflow conveyor and said food-product spreading system being cooperatively configured wherein said food-product spreading system discharges food-product pieces out more evenly across the lateral width of the receiving outflow conveyor.

4. The food-product tumbling and coating apparatus of claim 3, wherein:

the food-product spreading system comprises at least one angled paddle or wiper-blade mounted at or within an inside margin of the discharge end of the hollow drum; and a drive source for rotating the at least one angled paddle or wiper-blade at some rotation rate or some rotation manner not synchronized with the rotation of the hollow drum.

5. The food-product tumbling and coating apparatus of claim 3, wherein:

the food-product spreading system comprises "n" evenly-spaced counter-rotating paddles or wiper-blades mounted at or within an inside margin of the discharge end of the hollow drum and adapted to be driven "n:1" speed ratio relative to the rotary hollow drum whereby the food-product pieces land on or are picked up by the outflow conveyor in courses that trend diagonally across the lateral width of the receiving outflow conveyor.

6. The food-product tumbling and coating apparatus of claim 5, further comprising:

a set of counter-rotating fixed spokes distinct from and rotating contra-wise relative to the plurality of fixed spokes extending radially out from the outer sidewall of the drum motor roller to connect to the hollow drum;

said set of counter-rotating fixed spokes extending radially out from the outer sidewall of the drum motor roller to connect to the at least one counter-rotating angled paddle or wiper-blade;

said set of counter-rotating fixed spokes being disposed cooperatively relative to the plurality of fixed spokes such that the set of counter-rotating fixed spokes further downline and non-interfering with the plurality of fixed spokes;

said drum motor roller comprising a contra-rotation transmission system to drive the set of counter-rotating fixed spokes.

7. The food-product tumbling and coating apparatus of claim 6, wherein:

the contra-rotation transmission system comprises bevel gears.

8. The food-product tumbling and coating apparatus of claim 6, wherein:

the contra-rotation transmission system comprises planetary gears housed within the outer sidewall of the drum motor roller drive.

9. The food-product tumbling and coating apparatus of claim 1, wherein:

the engagement geometry on the stub ends comprises diametrically-opposed parallel flats on the stub ends and the complimentary engagement geometry for the cross bars comprises spaced flanking parallel side edges of slots in the cross bars.

10. The food-product tumbling and coating apparatus of claim 9, wherein:

the drum motor roller drive is simply supported by virtue of the stub ends engagement with the spaced flanking parallel side edges of the slots in the cross bars.

11. The food-product tumbling and coating apparatus of claim 1, wherein:

the drum motor roller drive is simply supported by virtue of the stub ends engagement with the cross bars.

12. The food-product tumbling and coating apparatus of claim 11, wherein:

wherein the cross bars are provided with lifting apertures adapted for engagement by lifting apparatus.

13. The food-product tumbling and coating apparatus of claim 11, wherein:

each cross bar comprises a given lifting aperture adapted for engagement by lifting apparatus; and said cross bars being configured and formed such that each cross bar's given lifting aperture are cooperatively located where the combination drum motor roller drive, hollow drum and rigid frame are relatively balanced the rigid frame relatively tends to find level.

14. The food-product tumbling and coating apparatus of claim 13, further comprising:

a roller-footed stand in or on which the combination drum motor roller drive, hollow drum and rigid frame are removably mounted;

said cross bars being configured and formed such that each cross bar's given lifting aperture are cooperatively located where the combination drum motor roller drive, hollow drum and rigid frame are lifted and removed from the roller-footed stand from one lateral side of the roller-footed stand.

15. The food-product tumbling and coating apparatus of claim 14, further comprising:

a dust cover for the roller-footed stand;

said dust cover having a closed position to contain escape of wafting coating material from the roller-footed stand; and said dust cover having an open position allowing removal and/or re-installation of combination drum motor roller drive, hollow drum and rigid frame, as well as substitution of an alternate combination drum motor roller drive, hollow drum and rigid frame having alternate proportions or provisions more adapted to one kind of food-product articles than another;

whereby one kind of food-product article comprises whole meat pieces and the coating material comprises edible dry particulate material.

16. The food-product tumbling and coating apparatus of claim 13, further comprising:

an infeed conveyor;

a receiving outflow conveyor; and a food-product spreading system; and said infeed conveyor and said hollow drum being cooperatively configured wherein said infeed conveyor is adapted to receive a feed of food-product pieces from upline apparatus and deposit the food-product pieces into the rotating hollow drum as thereby for tumbling and coating purposes;

said hollow drum and said receiving outflow conveyor being cooperatively configured wherein said rotating hollow drum discharges food-product pieces onto the receiving outflow conveyor.

17. The food-product tumbling and coating apparatus of claim 16, wherein:

the food-product spreading system comprises "n" evenly-spaced counter-rotating paddles or wiper-blades mounted at or within an inside margin of the discharge end of the hollow drum and adapted to be driven "n:1" speed ratio relative to the rotary hollow drum whereby the food-product pieces land on or are picked up by the outflow conveyor in courses that trend diagonally across the lateral width of the outflow conveyor.

18. The food-product tumbling and coating apparatus of claim 17, further comprising:

a set of counter-rotating fixed spokes distinct from and rotating contra-wise relative to the plurality of fixed spokes extending radially out from the outer sidewall of the drum motor roller to connect to the hollow drum;

said set of counter-rotating fixed spokes extending radially out from the outer sidewall of the drum motor roller to connect to the at least one counter-rotating angled paddle or wiper-blade;

said set of counter-rotating fixed spokes being disposed cooperatively relative to the plurality of fixed spokes such that the set of counter-rotating fixed spokes further downline and non-interfering with the plurality of fixed spokes;

said drum motor roller comprising a contra-rotation transmission system to drive the set of counter-rotating fixed spokes.

19. The food-product tumbling and coating apparatus of claim 18, wherein:

the contra-rotation transmission system comprises bevel gears.

20. The food-product tumbling and coating apparatus of claim 18, wherein:

the contra-rotation transmission system comprises planetary gears housed within the outer sidewall of the drum motor roller drive.

\* \* \* \* \*